(12) United States Patent
Tsern et al.

(10) Patent No.: US 6,378,018 B1
(45) Date of Patent: Apr. 23, 2002

(54) MEMORY DEVICE AND SYSTEM INCLUDING A LOW POWER INTERFACE

(75) Inventors: Ely K. Tsern, Los Altos, CA (US); Thomas J. Holman, Portland, OR (US); Richard M. Barth, Palo Alto, CA (US); Andrew V. Anderson, Portland, OR (US); Paul G. Davis; Craig E. Hampel, both of San Jose, CA (US); Donald C. Stark, Los Altos, CA (US); Abhijit M. Abhyankar, Sunnyvale, CA (US)

(73) Assignees: Intel Corporation, Santa Clara; Rambus, Inc., Los Altos, both of CA (US)

( * ) Notice: Subject to any disclaimer, the term of this patent is extended or adjusted under 35 U.S.C. 154(b) by 0 days.

(21) Appl. No.: 09/169,506

(22) Filed: Oct. 9, 1998

Related U.S. Application Data

(60) Provisional application No. 60/061,668, filed on Oct. 10, 1997.

(51) Int. Cl.[7] .............................. G06F 13/00; G06F 1/32
(52) U.S. Cl. ....................... 710/129; 710/128; 713/323; 713/320; 711/105; 711/5
(58) Field of Search ..................... 711/5, 105; 713/320, 713/323; 710/126, 128, 129

(56) References Cited

U.S. PATENT DOCUMENTS

| | | | | |
|---|---|---|---|---|
| 5,392,407 A | * | 2/1995 | Heil et al. | 710/113 |
| 5,787,298 A | * | 7/1998 | Broedner et al. | 713/323 |
| 5,859,809 A | * | 1/1999 | Kim | 365/222 |
| 5,938,742 A | * | 8/1999 | Faddell et al. | 710/9 |

OTHER PUBLICATIONS

Direct Rambus Technology Disclosure, Oct. 15, 1997, pp. 1–16.*
Rambus Direct RAC Data Sheet, Last Modified Aug. 7, 1998, pp. 1–46.*

* cited by examiner

*Primary Examiner*—Glenn Gossage
(74) *Attorney, Agent, or Firm*—Pennie & Edmonds LLP

(57) ABSTRACT

A memory system includes an interconnect structure with a high speed channel and a low speed channel. A memory device with interface circuitry is coupled to the interconnect structure. The interface circuitry includes a high power interface for coupling to the high speed channel and a low power interface for coupling to the low speed channel. The memory device is operative in a low power mode and a high power mode. A memory controller is coupled to the high speed channel and the low speed channel of the interconnect structure. The memory controller is configured to transmit control information over the low speed channel to set the power mode of the memory device. The memory device is operative in a low power mode during which high power receiver circuits are turned off. The memory device is also operative in a nap mode during which an internal clock compensation circuit is left on to preserve phase information. The memory system may include multiple memory devices coupled to a daisy chained lead of the interconnect structure. The memory controller may be configured to apply control information to the interconnect structure as an encoded device identification word. The memory devices may each include a decoder for interpreting the encoded device identification word. The memory controller may be configured to apply a memory device selection signal to the interconnect structure to selectively enable the memory devices.

32 Claims, 15 Drawing Sheets

*A: RSL cycle, high frequency, and tight tolerances for cycle variation, phase and data settling
*B: Unspecified phase relationship
*C: CMOS cycle, lower frequency, and loose tolerances for cycle variation, phase and data settling

MEMORY DEVICE AND SYSTEM INCLUDING A LOW POWER INTERFACE

This application claims priority to the provisional patent application entitled "Low Power Interface for a Memory Device", Ser. No. 60/061,668, filed Oct. 10, 1997.

BACKGROUND OF THE INVENTION

1. Field of the Invention

The present invention relates to memory devices and memory systems. More particularly, the invention relates to low power interfaces for use in memory devices and memory systems.

2. Description of the Related Art

In order to achieve high data bandwidth, some memory devices, such as synchronous dynamic random access memories (DRAMs) and Rambus® DRAMs, use high-speed electrical signaling, such as Rambus® Signaling Level (RSL), and clocked interfaces that pipeline the logic and datapaths to and from the core. Rambus® DRAMs are licensed by Rambus, Inc., Mountain View, Calif. For these synchronous interfaces, power becomes an important issue, particularly at high frequencies. High power consumption can exceed thermal cooling limits of the package or system or cause excessive battery drain in portable devices. Thus, it becomes important to manage this power optimally in a way that maximizes performance and minimizes system cost.

To manage power in these devices, various power modes can be used for the interface, each with different power consumption and turn-on latencies. Clocks can be divided into different "clock domains" and controlled with clock gating. Clock recovery circuits, such as delay locked loops (DLLs) or phase-locked loops (PLLs), can have different modes, each with different power and turn-on latencies. Receiver circuits for high-speed signaling often consume both direct current (DC) and alternating current (AC) power and can be separately controlled.

A memory device can have low power modes, in which the high power receiver circuits are turned off, internal interface clocks are disabled, and internal clock compensation circuits are turned off or placed in a nap state. Nap represents a state where portions of the internal clock compensation circuits are turned off to reduce power and some portions are left on so that phase information is stored. Nap is an intermediate state between fully on and off, in which the power consumption is lower than full on; exit latency from the Nap state is much less than the exit latency from the full off state.

For power modes with very low power consumption, high-speed signaling receivers can consume a relatively large portion of device power. With memory devices that only use a high-speed input/output (I/O) interface, at minimum, some portion of the receivers must be left on in order for the device to receive a command to exit from the low power mode.

SUMMARY OF THE INVENTION

A memory system includes an interconnect structure with a high speed channel and a low speed channel. A memory device with interface circuitry is coupled to the interconnect structure. The interface circuitry includes a high power interface for coupling to the high speed channel and a low power interface for coupling to the low speed channel. The memory device is operative in a low power mode and a high power mode. A memory controller is coupled to the high speed channel and the low speed channel of the interconnect structure. The memory controller is configured to transmit control information over the low speed channel to set the power mode of the memory device.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE PREFERRED EMBODIMENTS

Figure 1:
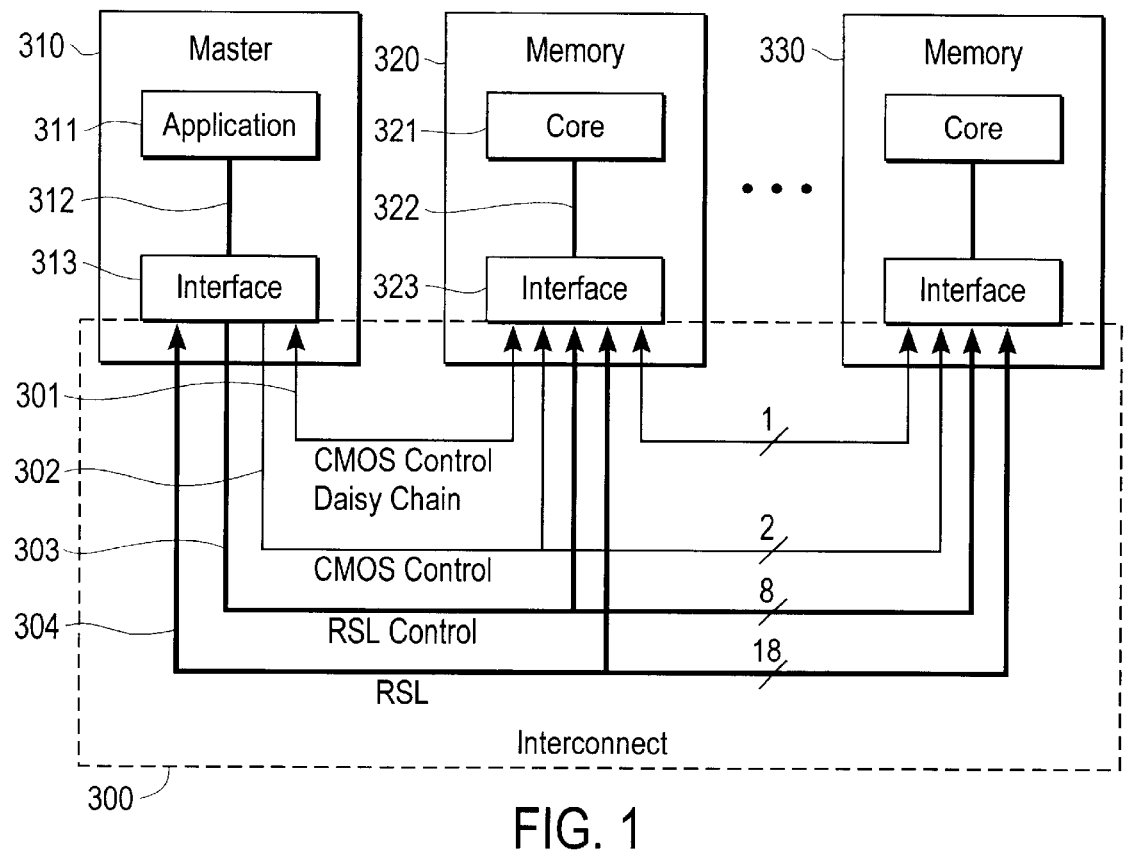
FIG. 1 illustrates an interconnect structure connected between a master device and memory devices that may be used in accordance with an embodiment of the invention.
Figure 2:
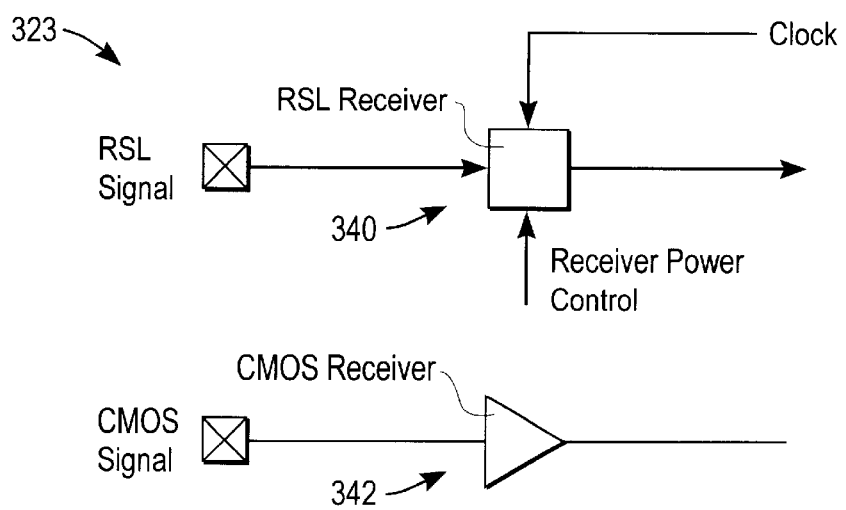
FIG. 2 illustrates input/output circuits that may be used in a memory interface of the invention.

The present invention comprises a memory device which has both a high power I/O interface and a low power I/O interface. High speed signaling typically requires receiver circuits that consume significant amounts of power, both in the standby state, when no signal is being received, and the active state. One example of a high speed channel is RSL (Rambus Signaling Level), which can operate up to 400 Megahertz (MHz), but requires clocked receiver circuits that can consume up to 5 milliwatt (mW) per pin when not being clocked and up to 10 mW per pin when clocked. Generally, low speed signaling can be done using receiver circuits that consume very little power. One example of a low-speed channel is complementary metal oxide semiconductor (CMOS) signaling, which can operate up to 100 to 200 MHz and can use CMOS gates or inverters as receivers that burn very little power when idle, typically as low as several nanowatts. FIG. 1 shows an interconnect structure 300 between a master device 310 and memory device 320 that consists of both a high speed channel 303, 304 and a low speed channel 301, 302. FIG. 2 shows a block diagram of the I/O circuits in the memory interface 323. The receiver circuits include a high power interface 340 and a low power interface 342.

The present invention comprises a memory device which has low power modes, in which the high power receiver circuits are turned off, internal interface clocks are disabled, and internal clock compensation circuits are turned off or are in a nap state. The present invention initiates the exit from these low power modes by sending a command sequence over the low power I/O interface.

Figure 3:
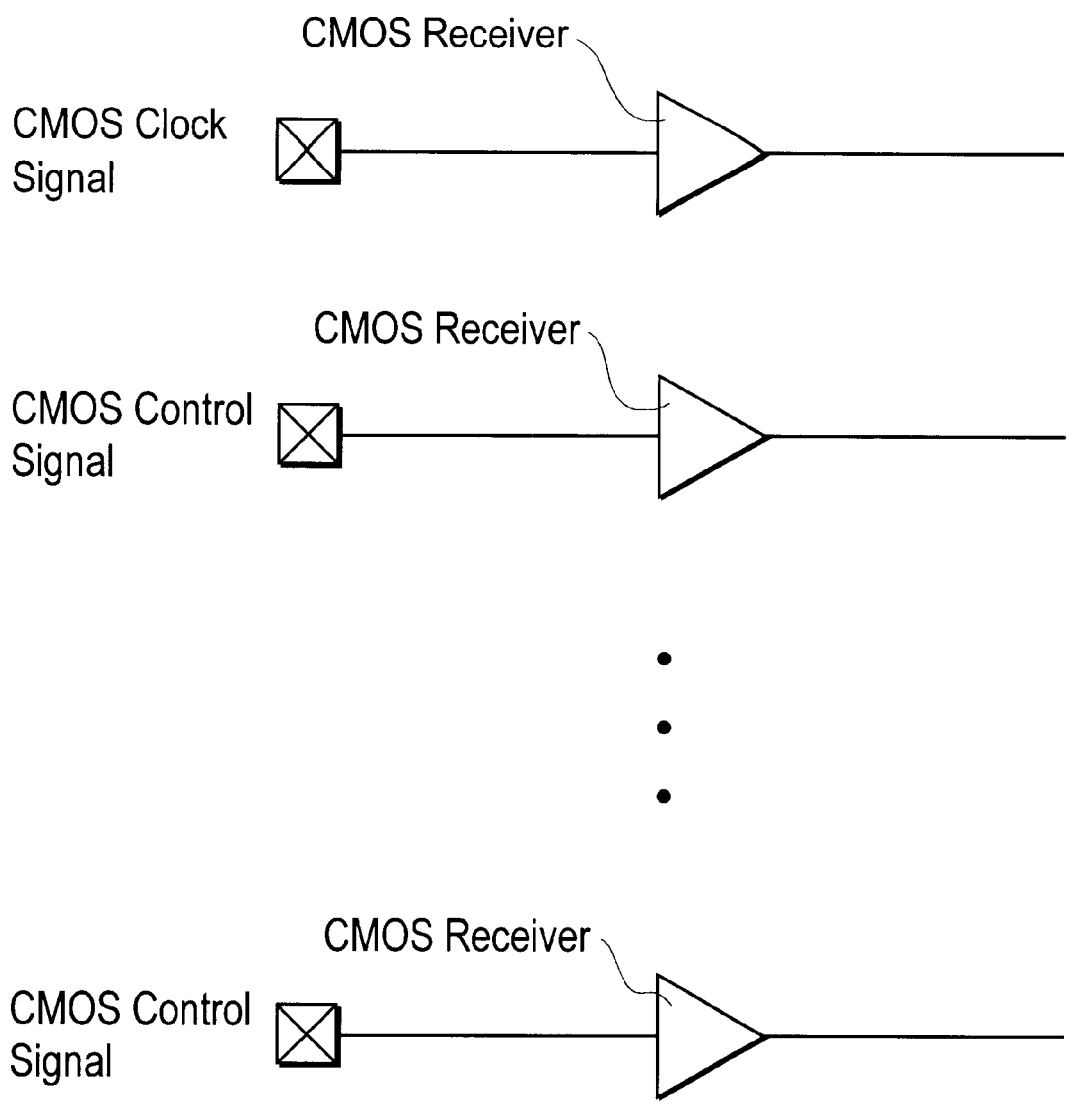
FIG. 3 illustrates a synchronous lower power input/output interface that may be used in accordance with an embodiment of the invention.
Figure 4:
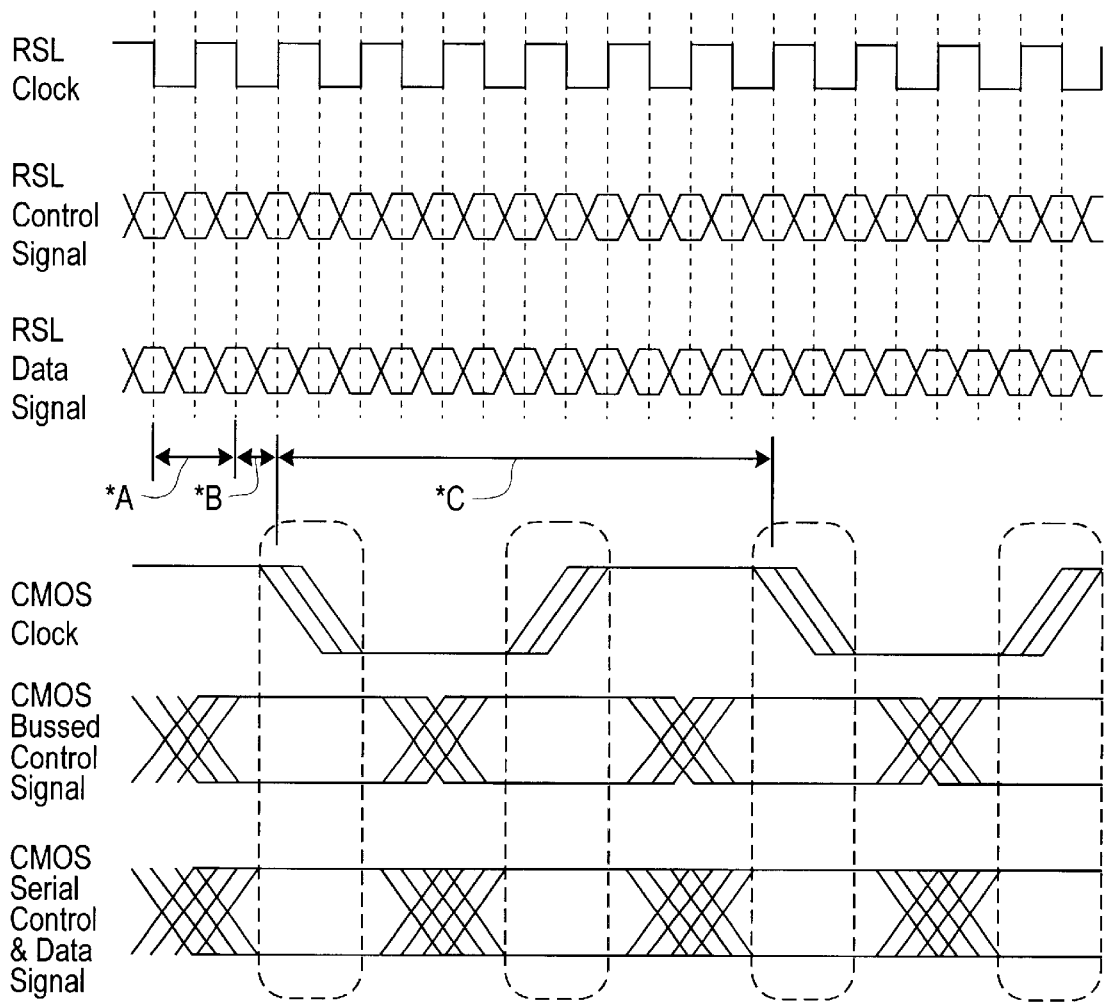
FIG. 4 illustrates interconnect timing operations in accordance with an embodiment of the invention.

The low power I/O interface can be structured with asynchronous or synchronous signals. With asynchronous signals, the rising and falling edge of signals can trigger events. A synchronous low power interface, as shown in FIG. 3, includes one or more CMOS receivers that receive CMOS control signals which are clocked by a CMOS clock signal. The command sequence to exit low power modes can be issued over either asynchronous or synchronous low power interface signals. FIG. 4 shows a timing diagram of both low power signaling (CMOS) and high power signaling (RSL), which may be used in accordance with an embodiment of the invention.

Figure 5:
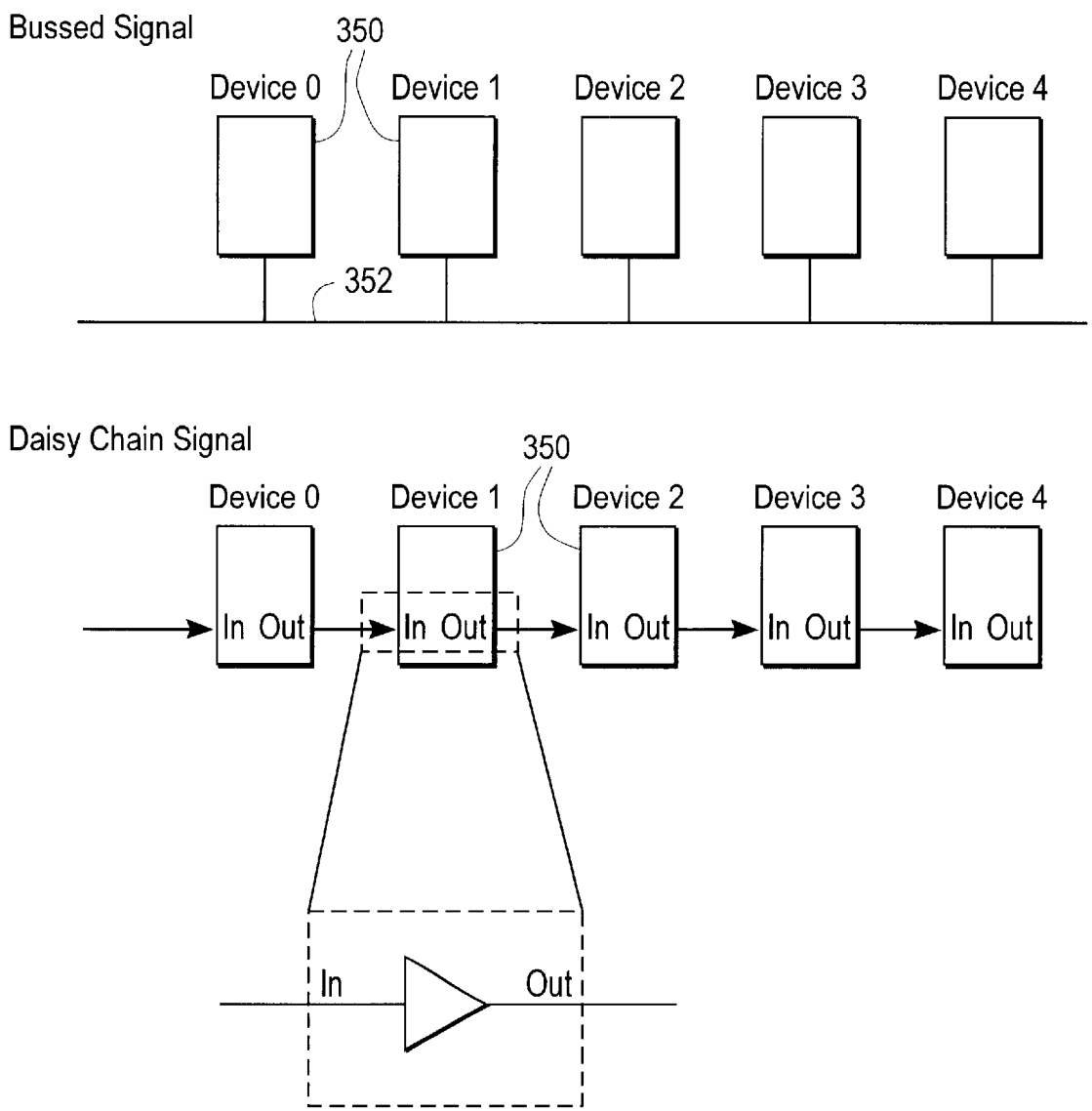
FIG. 5 illustrates bused and daisy-chain signaling topologies in accordance with embodiments of the invention.

The low power signals can also be bused or daisy-chained. FIG. 5 shows both signal topologies. With a daisy chain topology, a signal propagates through each device 350 on the channel 352. The additional signal propagation delay through each device 350, typically several nanoseconds, can make the total propagation time of the signal relatively long when many devices are positioned on the channel.

Each additional pin in the interface adds significant cost to the device. Therefore, it is often desirable to minimize the number of pins in the interface for a given set of operations that must be performed over those pins. There is a general trade-off between the number of pins and the latency to transmit some number of bits over those signals. The fewer the number of pins, the longer the latency.

Figure 6:
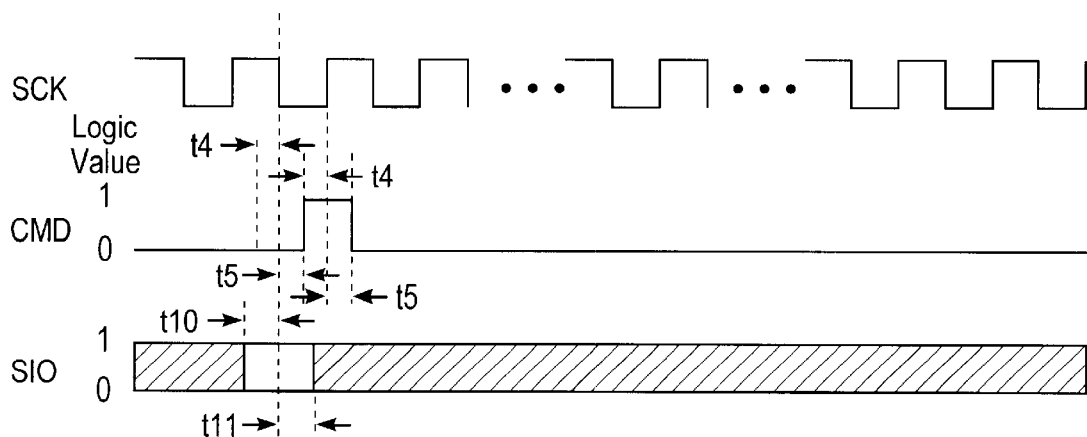
FIG. 6 illustrates timing diagrams for a synchronous low power mode exit operation in accordance with an embodiment of the invention.

FIG. 6 shows a timing diagram of a command sequence sent over the synchronous low power interface shown in FIG. 1. This command sequence includes a bused clock signal, SCK, a bused control signal, CMD, and a daisy chained signal, SIO. In this particular embodiment, the exit command is sent over a single wire, CMD, and is clocked by SCK. A two-bit sequence, 01, initiates the low power mode exit sequence. Low power mode exit latency is often an important performance metric that needs to be optimized. One aspect of the present invention is the transfer of the exit command sequence on both edges of the clock to minimize latency. A onebit sequence can also be used to further reduce latency, but would limit the use of the CMD pin to only one function. It may be desirable to issue other commands over the same pin, and the two-bit sequence allows this, as described later. Longer command sequences are also possible. For instance, the following encodings may be used: 00—do nothing; 01—low power mode exit; 10—reserved; 1100—reserved; and 1111—reserved.

Figure 7:
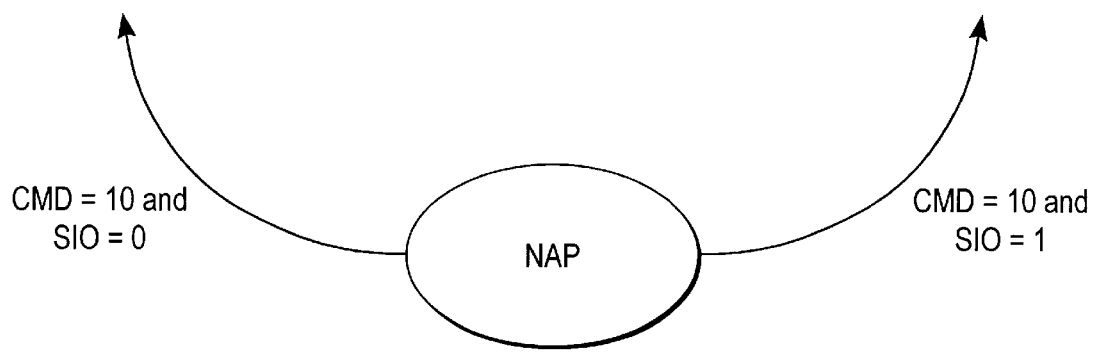
FIG. 7 illustrates a state diagram showing multiple exit transitions from a low power mode or nap state in accordance with an embodiment of the invention.

In this particular embodiment, the SIO signal is also used as part of the command sequence. The slow speed of the daisy-chained SIO signal means that latency insensitive operations, such as register operations and device initialization, are preferably performed on this signal. In this case, the value of the SIO signal selects one of two possible transitions from the low power mode "NAP", as shown in FIG. 7. Alternatively, if the daisy chained signal is too slow, alternative command sequences on CMD can be used to transition to other power modes. For instance, the 2-bit command sequences on CMD, "01" and "10", can be used to transition to two different higher power modes. Other latency-insensitive operations can also be placed on the daisy chained signal.

Figure 8:
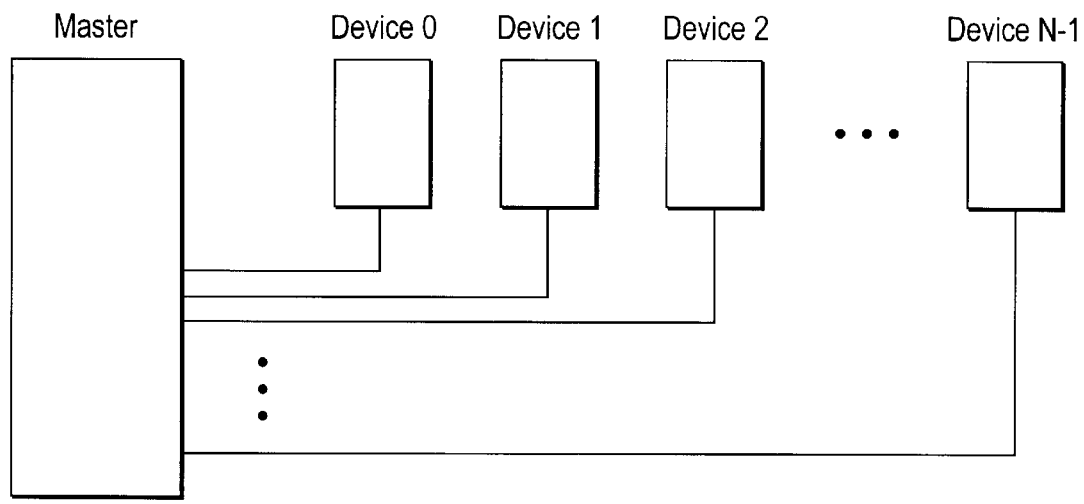
FIG. 8 illustrates separate control wires used to implant radial device selection in accordance with an embodiment of the invention.
Figure 9:
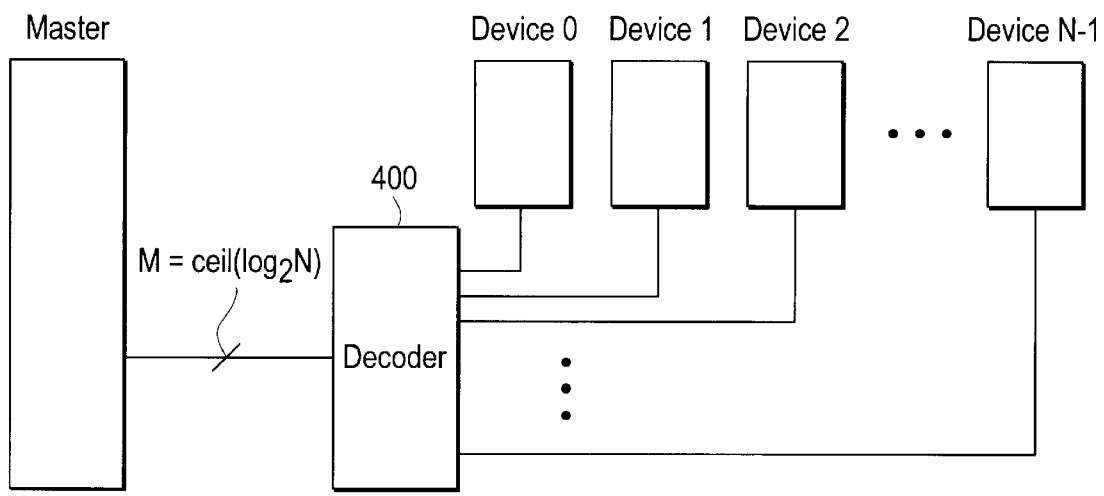
FIG. 9 illustrates a system with a decoder to implant radial device selection with an external decoder in accordance with an embodiment of the invention.

Low power exit commands can be broadcast so that all devices perform the exit upon receiving the command. However, for fine grain power control, it is desirable to be able to select specific devices to exit from low power mode. This device selection can be done in different ways. A common way to do this is to have separate control wires for each device, as shown in FIG. 8. While this radial approach provides full selectivity, it requires a separate wire per device, which means more wire routing between the master and memory devices plus more control pins on the controller, both of which add complexity and cost. To save pins on the master, another alternative is to have the master output an encoded device identification (ID) word, which then inputs to an external decoder chip 400. The decoder 400 separately drives each device on the channel. This is shown in FIG. 9.

Figure 10:
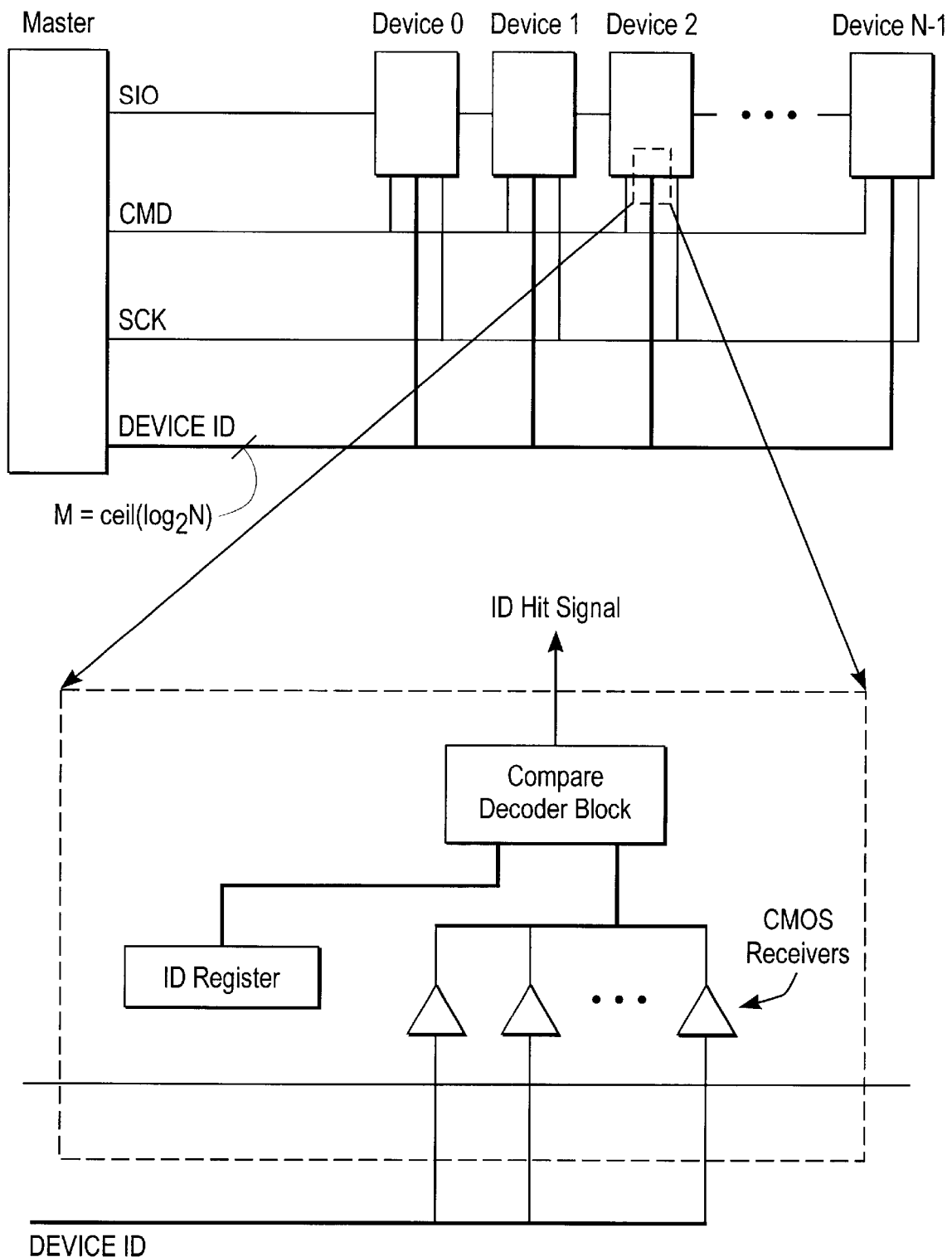
FIG. 10 illustrates interface circuitry for bused device identification with low power signals in accordance with an embodiment of the invention.

Another alternative is to place the decoder inside each memory device. The encoded device ID bits can be sent from the master to all the memory devices over separate sets of bused low power pins, as shown in the embodiment in FIG. 10. Each device has an internal ID register which is assigned during device initialization. The device ID bits sent over the low power pins are compared with the internal ID register, and if equal, an ID hit signal triggers the operation. If the device ID is M bits wide and the number of low power pins over which the ID bits are transmitted is less than M wide, the ID bits can also be packetized and clocked into the device using the low power clock signal.

Figure 11:
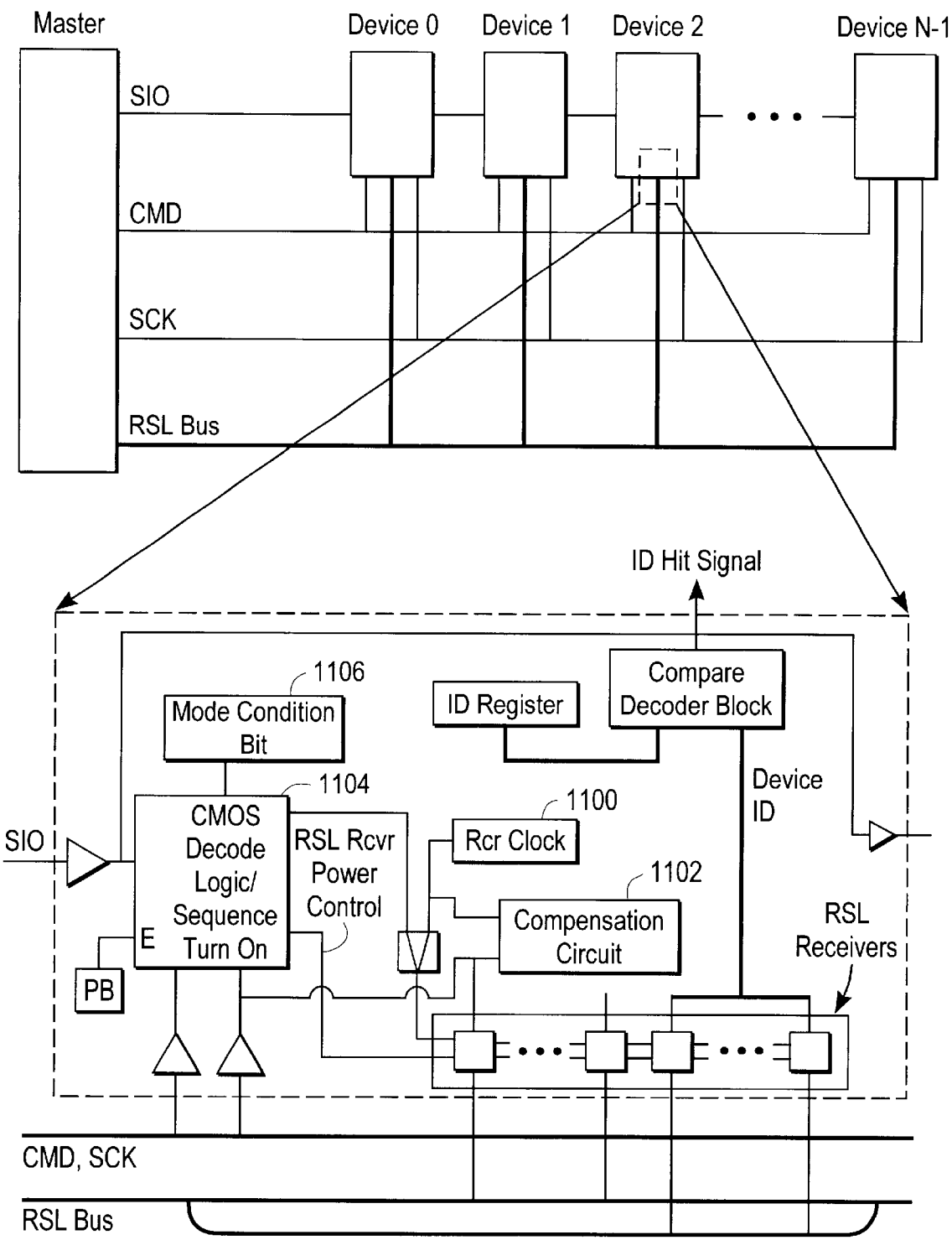
FIG. 11 illustrates RSL interface circuitry for bused device identification with high speed signals in accordance with an embodiment of the invention.

If the additional low power pins are not available, another alternative is to place the device ID bits on the high-speed pins. This approach is termed "parallel ID". FIG. 11 shows one embodiment of the interconnect structure of the memory system, where the RSL bus represents the bus of high-speed signals. Because the receivers for these high speed pins consume significant power, the present invention leaves these receivers off in the low power modes and turns them on only upon receiving a low power mode exit command. Once the receivers are on, a strobe signal is sent to the receivers to clock the ID bits into the device, and an internal decoder compares the device ID to an internal ID register which was assigned during device initialization. If the comparison is a match, the device performs the power mode exit. If not, the high-speed receivers are turned off and the device stays in the low power mode. FIG. 11 also shows the block diagram of these components in the memory interface. In particular, the figure illustrates a CMOS decode logic/ sequence turn-on circuit 1104, which is used to set a mode condition bit register 1106. FIG. 11 also illustrates a compensation circuit 1102, which receives a clock signal from a receiver clock 1100 and from the system clock SCK. As discussed below, the compensation circuit 1102 may be a delay-locked loop or a phase-locked loop circuit. Note that these high-speed pins can also be used for other functions as well.

Figure 12:
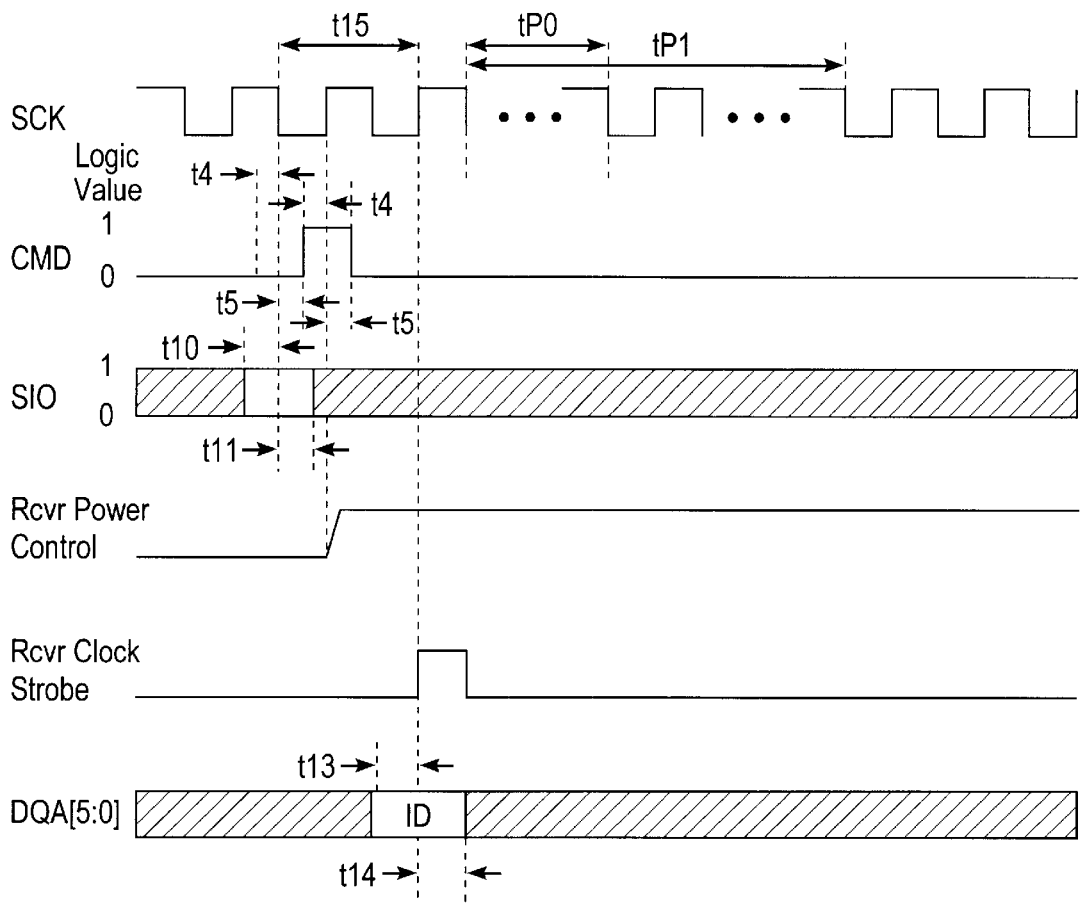
FIG. 12 illustrates timing diagram for a synchronous low power mode exit operation in accordance with an embodiment of the invention.

FIG. 12 shows the timing diagram of the power mode exit command using this device selection scheme of the embodiment shown in FIG. 11. The device ID bits are strobed one cycle after the exit command is issued on CMD. This one cycle latency accounts for the time to turn on the high speed receiver circuits.

Figure 13:
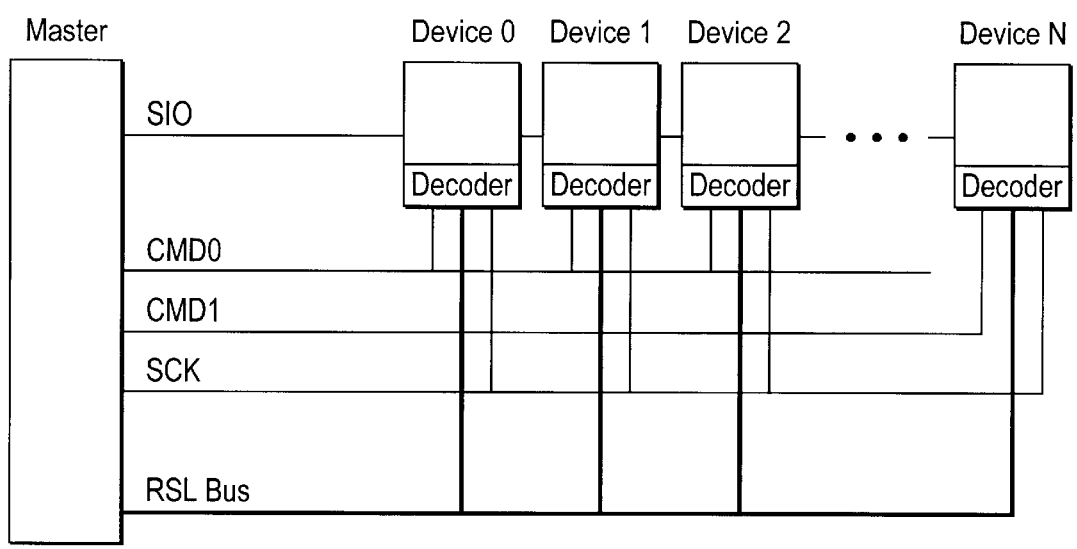
FIG. 13 illustrates an embodiment of the invention that utilizes multiple lines in a master-slave system to reduce spectator power.

If CMD and SCK are bused to all devices, each exit command would cause each device to turn-on some of its high-speed receivers and clock them in order to determine which is the target device. This can consume a significant amount of power, which is referred to as spectator power. An alternative is to use additional CMD or SCK signals to reduce spectator power. These additional CMD or SCK signals can be used to reduce the number of devices performing the decoding operation by subdividing the devices into subgroups. FIG. 13 illustrates individual devices, each of which includes a decoder. FIG. 13 shows how two CMD signals, CMD0 and CMD1, select all even or odd numbered devices, respectively. The master controls both the device ID and which CMD signal the command gets issued on. Since only half the devices on the channel receive the command signal, the spectator power is reduced in half. This concept can easily be extended using additional CMD or SCK signals.

The invention may also be implemented with a memory device with a programmable storage bit which configures the device to enable or disable the parallel ID device selection. The setting of the programmable storage bit determines whether the memory device is responsive to the parallel ID device selection signal. For example, the programmable storage bit (PB) may be used as an enable signal for the CMOS decode logic, as shown in FIG. 11.

The device ID word may also include an encoding that designates a broadcast, so that all devices will exit the low power mode. This mechanism is useful for phase compensation maintenance operations, which are described later.

In order to perform the low power mode exit, the memory interface may require sequential turn-on. For instance, a memory interface may comprise multiple blocks, each with separate turn-on control. These blocks may need to be turned on in a particular sequential order with specific time intervals between blocks. These timing events may be generated multiple ways. One approach is to use a one-shot timing circuit, which typically consists of an analog Resistive Capacitive (RC) circuit. However, these circuits do provide inaccurate timing delay, as they are inherently sensitive to process and temperature variation. Another alternative is to send additional control signals to the device at the proper times. This has the undesirable characteristic of consuming additional control bandwidth and requires the master to keep track of these timing events and issue the controls at the proper times, thus adding complexity to the master logic.

Figure 14:
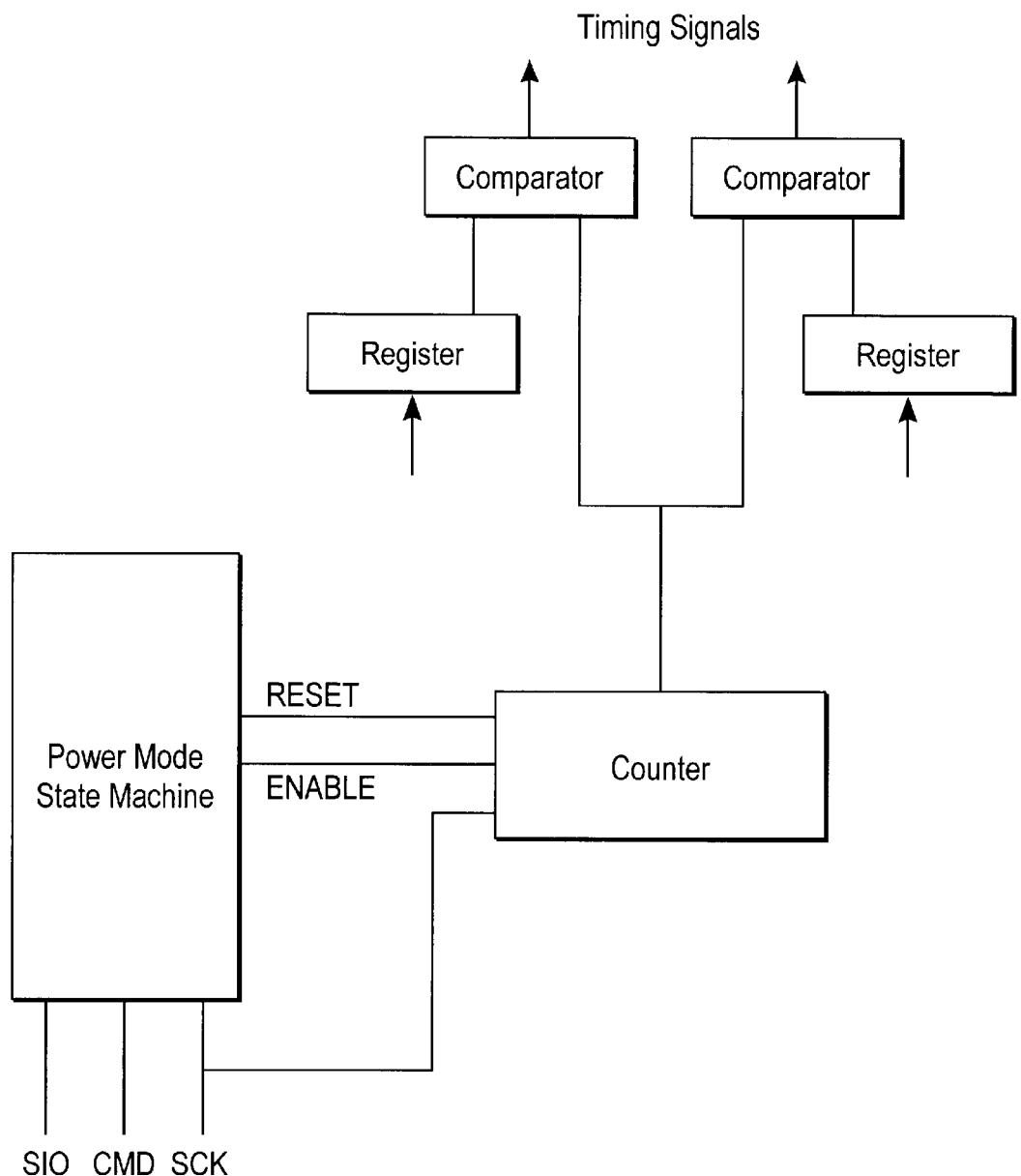
FIG. 14 illustrates an internal timing event generator block in accordance with an embodiment of the invention.

An internal time counter which counts the number of clock cycles from the low power clock signal may be used. The counter is reset upon entering the low power mode and is enabled to count upon receiving the exit command directed to that given device. The invention also uses internal programmable registers, which contain different count values that are compared with the time counter. There is a programmable register for each timing event that is required for a low power exit. Each register is compared to the counter value, and when those values match, the timing event is issued. FIG. 14 shows the block diagram of a circuit that may be used to implement this technique. This mechanism allows the master to issue a single exit command, and after a certain period of time, the device will automatically be in the next power mode.

Figure 15:
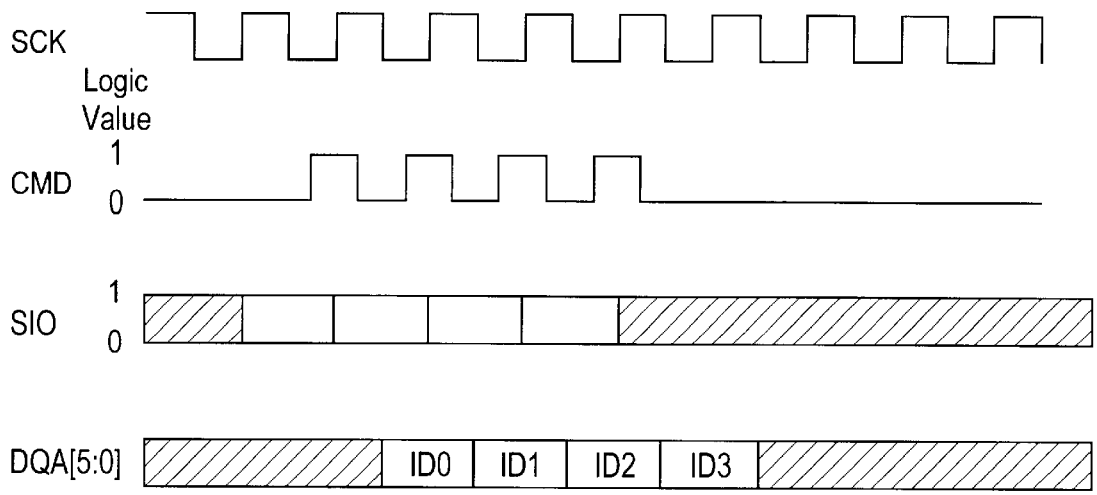
FIG. 15 illustrates timing diagrams for consecutive pipelined exit commands to different devices in accordance with an embodiment of the invention.

The present invention also supports the ability to issue a command sequence to a different device on every clock cycle. Given limited pin resources, the combination of parallel ID device selection and internal time counter mechanisms allow for an exit command to be issued on every clock cycle without conflict on the channel in a pipelined fashion. FIG. 15 shows a timing diagram of multiple exit commands issued back-to-back to different devices.

Entering low power modes can be performed by issuing commands over the low power signals or over the high-speed control signals. Over the low power signals, a distinct command sequence can be assigned to this operation. Over the high-speed control signals, a distinct opcode can be assigned, which can be a part of a control packet.

While the device is in a low power mode, other maintenance operations may be required. In a DRAM, core refresh operations must still occur periodically in order to retain stored memory bits. Also, phase compensation circuits in the memory interface, such as a delay locked loop (DLL) or phase locked loop (PLL), may be placed in special "nap" modes while the device is in a low power state. When the phase compensation circuit is in a nap state, the device is termed to be in nap mode. In nap mode, the stored phase information may have to be "refreshed" periodically to maintain accurate information. This phase refresh operation may require that the highspeed clock receivers, internal clock buffers, and phase compensation circuit be turned on in order to re-acquire updated phase information, which may have changed over time due to temperature and voltage variations in the system. To trigger either of these maintenance operations, it is also possible to issue distinct commands over the low power signaling interface.

One way to perform the phase refresh operation is to bring the device out of nap mode using the exit command into a device mode where the phase compensation circuit is turned on and can acquire updated phase information. With many devices on the channel, an efficient way to perform this operation is to use the broadcast encoding on the device ID word, described earlier, to bring all devices in nap mode out of that mode. Once the phase information is updated, a broadcast entry command can be issued to all devices to re-enter nap mode.

For memory systems with many memory devices, it is possible to have devices in different power modes simultaneously. For instance, some devices may be in high power modes, where memory transactions are occurring over highspeed signals, and other devices may be in nap mode. For these mixed-mode scenarios, the above mentioned broadcast nap re-entry command would place all devices on the channel into nap mode, which would be undesirable, particularly if it is desired to keep some devices in higher power modes in order to decrease latency to those devices. One alternative is to individually issue nap entry commands to all devices previously in nap mode; this approach can introduce additional control overhead and latency.

Figure 16:
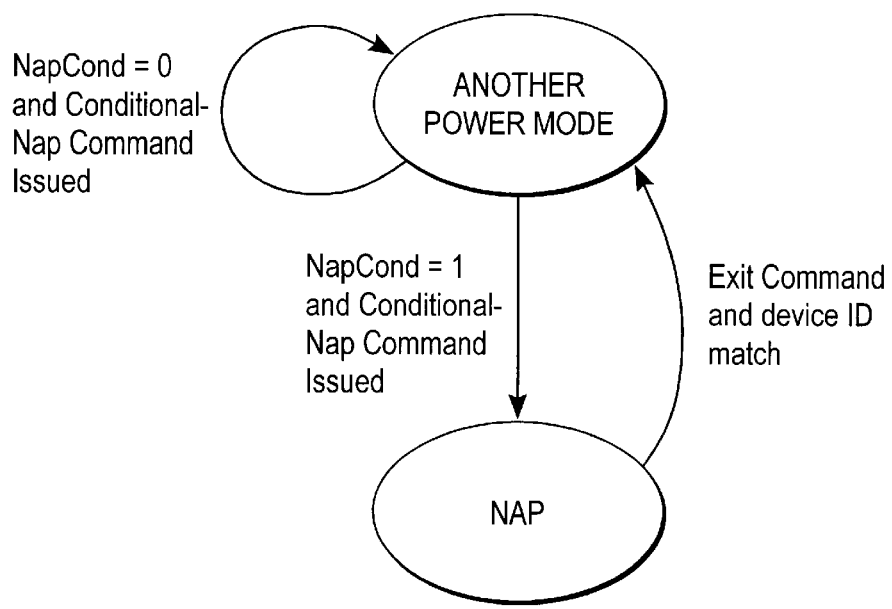
FIG. 16 illustrates a state diagram for conditional and unconditional nap entry in accordance with an embodiment of the invention.

To solve this nap overhead problem, the present invention uses a conditional nap entry command. This command could be issued over the low power signals or high-speed signals and uses an internal bit stored in the device called the NapCond bit. If NapCond=1 and a conditional nap entry command is issued, the memory device enters nap mode from a higher power mode. If NapCond=0 and a conditional nap entry command is issued, the memory device does not enter nap mode. The value of the NapCond state bit is set to 1 whenever the device enters nap mode and is set to 0 whenever memory core operation occurs (row or column operation). FIG. 16 shows the state diagram for these transitions.

Figure 17:
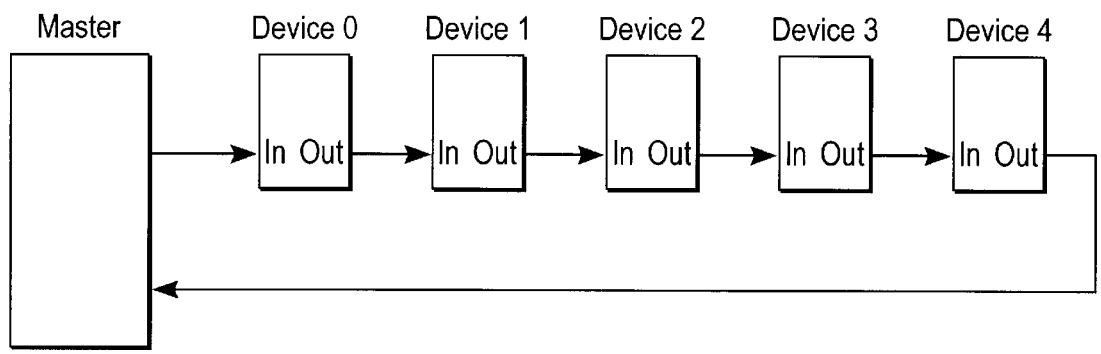
FIG. 17 illustrates a unidirectional daisy-chain topology with a return signal in accordance with an embodiment of the invention.
Figure 18:
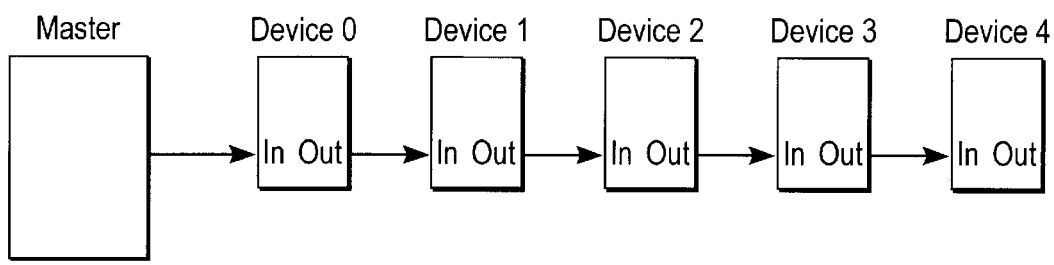
FIG. 18 illustrates a bidirectional daisy-chain topology with a return signal in accordance with an embodiment of the invention.
Figure 18:
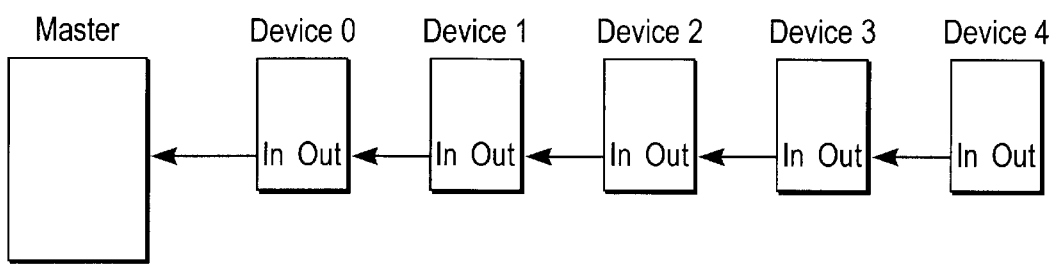
Figure 19:
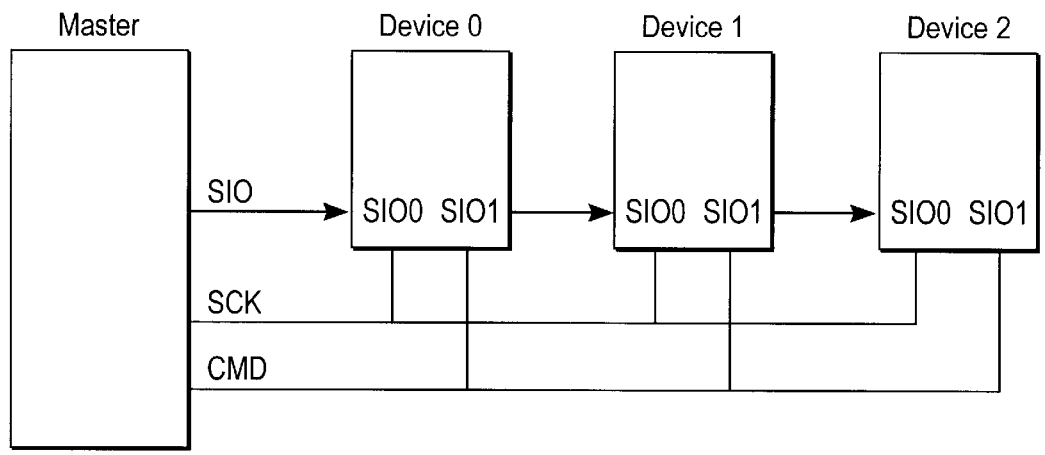
FIG. 19 illustrates a circuit topology that exploits a daisy chain signal SOI controlled by SCK and CMD signals in accordance with an embodiment of the invention.
Figure 20:
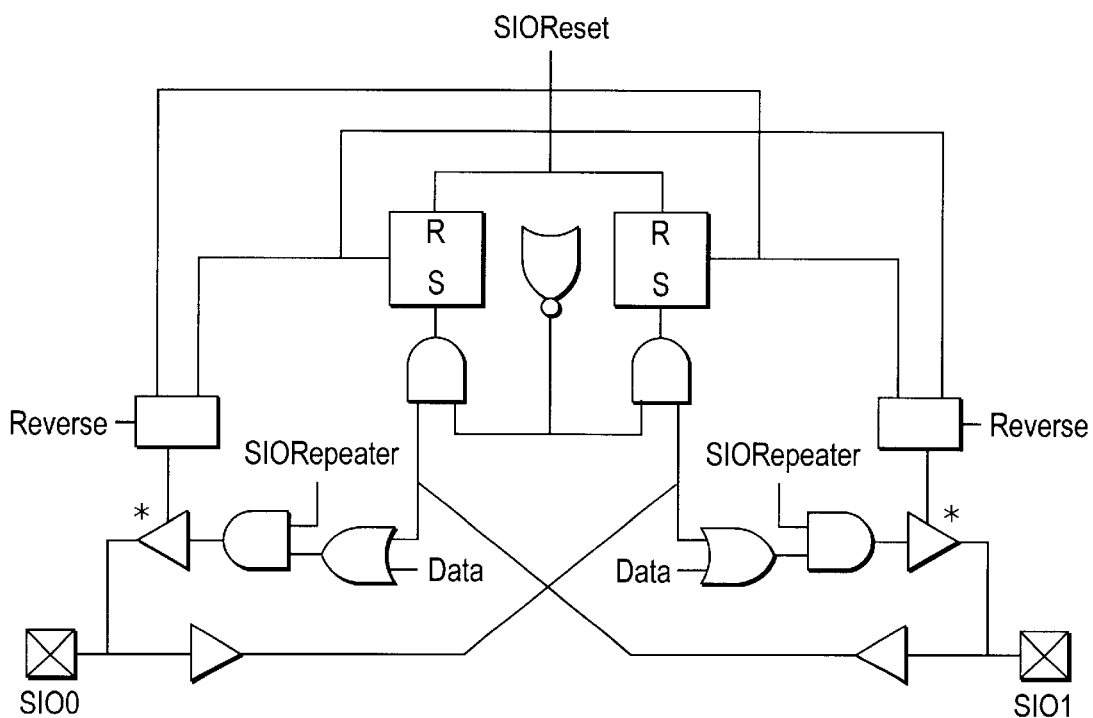
FIG. 20 illustrates a circuit for a bidirectional daisy chain signal in accordance with an embodiment of the invention.
Figure 21:
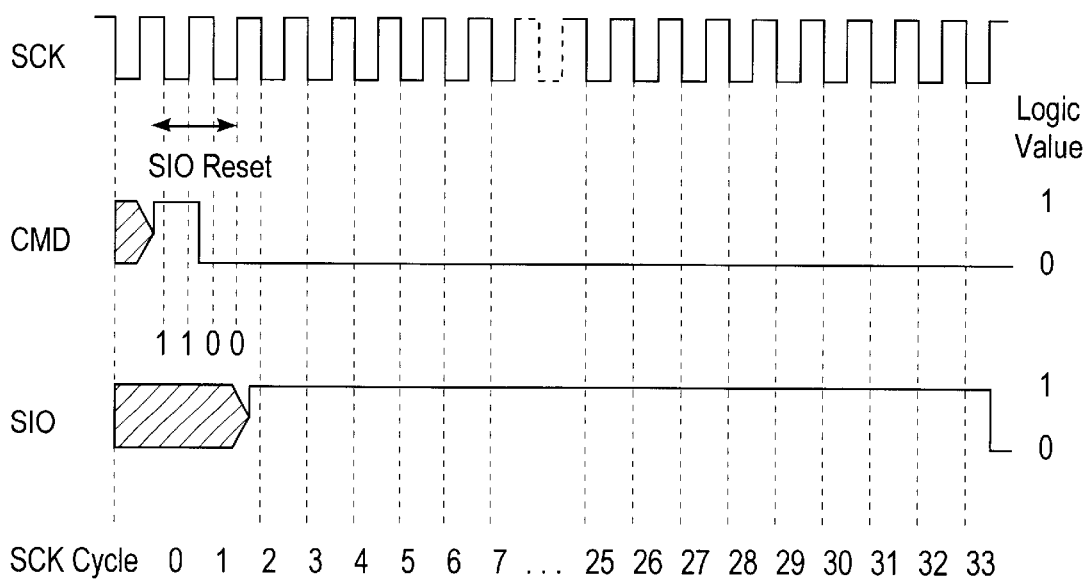
FIG. 21 illustrates timing diagrams for daisy chain pin initialization signaling in accordance with an embodiment of the invention.

Another aspect of this invention is the bidirectional SIO signal daisy chain. With a unidirectional daisy chain, the return signal to the master must be separately routed from the last device to the master, as shown in FIG. 17. The return signal can be used to deliver data, such as data stored in internal configuration registers, driven by any single device back to the master. A novel approach is to use a bidirectional daisy chain, which reverses direction whenever data is driven from device to master, as illustrated in FIG. 18. In the figure, data is driven by device 2 and the directionality of the daisy chain I/O pins are reversed for device 0 and device 1. This saves a pin on the master by eliminating the need for a return signal from the end of the daisy chain. FIG. 20 shows one embodiment of the circuit inside a memory device to implement this bidirectional daisy chain. The timing sequence in FIG. 21 shows the assertion of the SIOReset command, which triggers the SIOReset signal in FIG. 20, and the assertion of SIO for multiple SCK cycles. The SIOReset signal resets both SIO pins to be inputs. Afterwards, since the SIO signal is being driven to only one of SIO pins, the assertion of SIO sets one of the inputs, SIO0 or SIO1, to become the input pin and the other SIO pin becomes the output pin. The use of a bidirectional daisy chain is not limited to memory devices and can be used in any electrical block or device.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A memory system, comprising:
   an interconnect structure having a high speed channel and a low speed channel;
   a memory device, said memory device having interface circuitry coupled to said interconnect structure, said interface circuitry including a high power interface for coupling to said high speed channel and a low power interface for coupling to said low speed channel, said memory device being operative in a low power mode and a high power mode; and
   a memory controller coupled to said high speed channel and said low speed channel of said interconnect structure, said memory controller configured to transmit control information over said low speed channel to set the power mode of said memory device.

2. The memory system of claim 1 wherein said memory device is operative in a low power mode during which high power receiver circuits of said interface circuitry are turned off.

3. The memory system of claim 1 wherein said interconnect structure is a bus.

4. The memory system of claim 1 wherein said memory controller is configured to apply said control information to said interconnect structure on both edges of a control clock signal.

5. The memory system of claim 1 wherein there are a plurality of memory devices and wherein said memory controller is configured to apply control information to said interconnect structure that is simultaneously received by each memory device of said plurality of memory devices.

6. The memory system of claim 1 wherein there are a plurality of memory devices and wherein said memory controller is configured to apply control information to said interconnect structure as an encoded device identification word, said memory system further comprising a decoder connected to said interconnect structure to process said encoded device identification word and generate a decoded control signal that is applied to selected memory devices of said plurality of memory devices.

7. The memory system of claim 1 wherein said memory controller is configured to apply control information to said interconnect structure that is processed by said memory device high speed interface to transition said memory device from said high power mode to said low power mode.

8. The memory system of claim 1 wherein said memory device includes a programmable storage bit whose value determines whether said memory device is responsive to a parallel identification device selection signal.

9. The memory system of claim 1 wherein said memory controller is configured to apply control information to said low speed channel to transition said selected memory device from said high power mode to said low power mode.

10. The memory system of claim 1,
    wherein there are a plurality of memory devices; and
    wherein the interface circuitry in each of said memory devices includes a power mode condition bit which is set whenever a respective one of said memory devices enters a low power mode and is reset whenever a memory core operation occurs within the respective memory device, so that when the interface circuitry of each of the memory devices receives a conditional nap entry command following a nap exit command, only selected memory devices of said plurality of memory devices having the condition bit set return to said low power mode.

11. The memory system of claim 1 wherein said memory device is operable in a nap mode during which an internal clock compensation circuit of said interface circuitry is left on to preserve phase information.

12. The memory system of claim 11 wherein said internal clock compensation circuit includes a delay locked loop circuit coupled to said interconnect structure, wherein the delay locked loop circuit preserves state information during said nap mode.

13. The memory system of claim 1 wherein there are a plurality of memory devices, said interconnect structure including a daisy chained lead connected between each memory device of said plurality of memory devices.

14. The memory system of claim 13 wherein said plurality of memory devices include bidirectional daisy chain circuits to support bidirectional communication between any one of said plurality of memory devices and said memory controller.

15. The memory system of claim 1 wherein said memory controller is configured to apply control information to said interconnect structure as an encoded device identification word, said memory system further comprising a plurality of memory devices wherein each memory device includes a decoder for interpreting said encoded device identification word.

16. The memory system of claim 15 wherein said decoder is connected to said high speed channel.

17. The memory system of claim 15 wherein said memory controller is configured to apply a memory device selection signal to said interconnect structure to enable selected memory devices to interpret said encoded device identification word.

18. The memory system of claim 1 wherein said memory device includes a sequenced turn-on control circuit coupled to said low power channel to transition from said low power mode to said high power mode.

19. The memory system of claim 18 wherein said sequenced turn-on control circuit is a one-shot timing circuit.

20. The memory system of claim 18 wherein said sequenced turn-on control circuit includes an internal counter which counts clock cycles from a low power clock signal received via said low power channel.

21. The memory system of claim 20 wherein said sequenced turn-on control circuit includes programmable registers coupled to the internal counter to store count values for timing events.

22. A memory device for coupling to an interconnect structure that includes a high speed channel and a low speed channel, comprising:

a memory core for storing data; and interface circuitry coupled to said memory core, said interface circuitry including a high power interface for coupling with said high speed channel and a low power interface for coupling with said low speed channel, said interface circuitry configured to receive control information from said low speed channel to set a power mode of said memory device.

23. The memory device of claim 22 wherein said memory device is operable in a low power mode during which high power receiver circuits of said interface circuitry are turned off.

24. The memory device of claim 22 wherein said memory device is operable in a nap mode during which an internal clock compensation circuit of said interface circuitry is left on to preserve phase information.

25. The memory system of claim 22 wherein said interface circuitry includes a delay locked loop circuit coupled to said memory core, wherein the delay locked loop circuit preserves state information during a nap mode.

26. The memory device of claim 22 further comprising a programmable storage bit whose value determines whether said memory device is responsive to a parallel identification device selection signal.

27. The memory device of claim 22 wherein said interface circuitry includes a bidirectional serial port to support bidirectional communication over a single pin with an adjacent memory device.

28. The memory device of claim 22 wherein said interface circuitry includes a decoder for interpreting an encoded device identification word.

29. The memory device of claim 22 wherein said memory device includes a sequenced turn-on control circuit coupled to the low speed channel to transition from said low power mode to said high power mode.

30. The memory device of claim 29 wherein said sequenced turn-on control circuit is a one-shot timing circuit.

31. The memory device of claim 29 wherein said sequenced turn-on control circuit includes an internal counter which counts clock cycles from a low power clock signal received via the low speed channel.

32. The memory device of claim 31 wherein said sequenced turn-on control circuit includes programmable registers coupled to the internal counter to store count values for timing events.

* * * * *